United States Patent
Choi et al.

(10) Patent No.: US 9,049,279 B2
(45) Date of Patent: Jun. 2, 2015

(54) MOBILE TERMINAL

(71) Applicant: LG ELECTRONICS INC., Seoul (KR)

(72) Inventors: Taewha Choi, Gunpo (KR); Sanghee Nam, Seoul (KR); Hyoungwook Lim, Seoul (KR); Insu Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 34 days.

(21) Appl. No.: 13/736,813

(22) Filed: Jan. 8, 2013

(65) Prior Publication Data

US 2013/0184032 A1    Jul. 18, 2013

(30) Foreign Application Priority Data

Jan. 12, 2012 (KR) .................. 10-2012-0003901

(51) Int. Cl.
*H04M 1/00* (2006.01)
*H04N 5/225* (2006.01)
*H04M 1/02* (2006.01)

(52) U.S. Cl.
CPC .................. *H04M 1/0264* (2013.01)

(58) Field of Classification Search
CPC ...... H04M 1/0264; H04N 5/2254; G03B 9/14
USPC ........................................ 455/556.1
See application file for complete search history.

(56) References Cited

U.S. PATENT DOCUMENTS

| | | | |
|---|---|---|---|
| 8,000,598 B1 * | 8/2011 | Tsai | 396/534 |
| 2004/0258405 A1 * | 12/2004 | Shiratori et al. | 396/458 |
| 2008/0227480 A1 * | 9/2008 | Cho et al. | 455/550.1 |
| 2011/0255000 A1 * | 10/2011 | Weber et al. | 348/374 |

* cited by examiner

*Primary Examiner* — William Nealon
(74) *Attorney, Agent, or Firm* — Birch, Stewart, Kolasch & Birch, LLP

(57) ABSTRACT

A mobile terminal is provided. The mobile terminal includes a terminal body having a case defining an appearance of the terminal body, the case having at least one opening, a window disposed to shield the opening and a support frame located within the case, the window being mounted on the support frame. The support frame includes a first member to which the window is coupled and a second member integrally formed with the first member, the second member being coupled to the case.

20 Claims, 10 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0003901, filed on Jan. 12, 2012, the contents of which is incorporated by reference herein in its entirety.

BACKGROUND OF THE INVENTION

1. Field of the Invention

This specification relates to a coupling structure between a case defining an appearance of a terminal and a display or camera mounted to the terminal.

2. Description of Related Art

As it becomes multifunctional, a mobile terminal can be allowed to capture still images or moving images, play music or video files, play games, receive broadcast and the like, so as to be implemented as an integrated multimedia player.

Terminals may be divided into mobile/portable terminals and stationary terminals according to their mobility. Mobile terminals (mobile device, portable device, portable terminal) can be easily carried and have one or more of functions such as supporting voice and video telephony calls, inputting and/or outputting information, storing data and the like.

Many efforts are undergoing to support or enhance various functions of such mobile terminals. Such many efforts include not only changes and improvement of structural components implementing a mobile terminal but also software or hardware improvement. Especially, a case of a mobile terminal is formed by a front case and a rear case coupled to each other, to define an appearance of the terminal. The case may expose a display or a camera therethrough. Here, it may be taken into account that a case and a display or the case and a camera are coupled to each other to have appropriate rigidity without increasing a thickness of the terminal due to the display or camera having a predetermined thickness.

BRIEF SUMMARY OF THE INVENTION

Therefore, an aspect of the detailed description is to provide a mobile terminal in which a case and a display or a case and a camera are coupled to each other.

Another aspect of the detailed description is to provide a terminal having a more improved structure and a slimmer thickness.

To achieve these and other advantages and in accordance with the purpose of this specification, as embodied and broadly described herein, there is provided a mobile terminal including a terminal body, a case defining an appearance of the terminal body, the case having at least one opening, a window disposed to shield the opening, and a support frame formed within the case, the window being mounted on the support frame, wherein the support frame may include a first member to which the window is coupled, and a second member integrally formed with the first member and coupled to the case.

In accordance with one aspect of the present closure, the mobile terminal may further include an adhesive layer formed between the window and the first member such that the window and the first member are coupled to each other.

In accordance with one exemplary embodiment, the second member may include a coupling portion to which the first member is coupled, a first curved portion curved from the coupling portion to the inside of the terminal body and extending by a predetermined height, and a second curved portion curved from one end of the first curved portion and extending toward the case.

In accordance with one aspect of the present closure, the second curved portion may be coupled to the case.

In accordance with one aspect of the present closure, the second curved portion may have at least a part inserted into the case.

In accordance with one aspect of the present closure, the second member made of a metal may be integrally molded with the case made of synthetic resin by insert injection.

In accordance with one aspect of the present closure, the first member may include a mounting portion to which the window is coupled, and an extending portion extending to face the coupling portion and coupled to the coupling portion.

In accordance with one aspect of the present closure, the window may be disposed to contact one side surface of the second member to be prevented from being laterally moved.

In accordance with one aspect of the present closure, the first member and the second member may be integrally welded with each other.

In accordance with one aspect of the present closure, the mobile terminal may further include a camera module disposed through the opening and allowing for inputting an image, and the first member and the camera module may be disposed with interposing a buffering pad therebetween.

In accordance with another exemplary embodiment, there is provided a mobile terminal including a terminal body, a first case defining an appearance of the terminal body, and having a first opening, a second case having a second opening and disposed within the first case, the second opening communicating with the first opening, and a support frame formed within the second case and having a window mounted thereon, wherein the support frame may include a first member to which the window is coupled, and a second member integrally formed with the first member and coupled to the second case.

In accordance with one aspect of the present closure, the mobile terminal may further include an adhesive layer formed between the window and the first member such that the window and the first member are coupled to each other.

In accordance with one aspect of the present closure, the second member may include a coupling portion to which the first member is coupled, a first curved portion curved from the coupling portion to the inside of the terminal body and extending by a predetermined height, and a second curved portion curved from one end of the first curved portion and extending toward the second case.

In accordance with one aspect of the present closure, the second curved portion may be coupled to the second case.

In accordance with one aspect of the present closure, the second curved portion may have at least a part inserted into the second case.

In accordance with one aspect of the present closure, the second member made of a metal may be integrally molded with the second case made of synthetic resin by insert injection.

In accordance with one aspect of the present closure, the first member may include a mounting portion to which the window is coupled, and an extending portion extending to face the coupling portion and coupled to the coupling portion.

In accordance with one aspect of the present closure, the window may be disposed to contact one side surface of the second member to be prevented from being laterally moved.

In accordance with one aspect of the present closure, the first member and the second member may be integrally welded with each other.

In accordance with one aspect of the present closure, the mobile terminal may further include a camera module disposed through the openings and allowing for inputting an image, and the first member and the camera module may be disposed with interposing a buffering pad therebetween.

In accordance with one aspect of the present closure, at least a part of the second member may protrude through the second opening from inside to outside of the second case.

In accordance with one aspect of the present closure, the first case may include a recess recessed into an inner surface thereof, and the protruding portion of the second member may be inserted into the recess to be prevented from protruding to the outside of the first case.

A mobile terminal according to at least one exemplary embodiment of the present disclosure may include a window and a case on the same flat surface, to acquire a unique appearance and unusual attraction. This may allow for providing a mobile terminal having a more attractive appearance.

Also, the integral formation of a support frame and a case may increase rigidity of a terminal, resulting in providing a slimmer mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
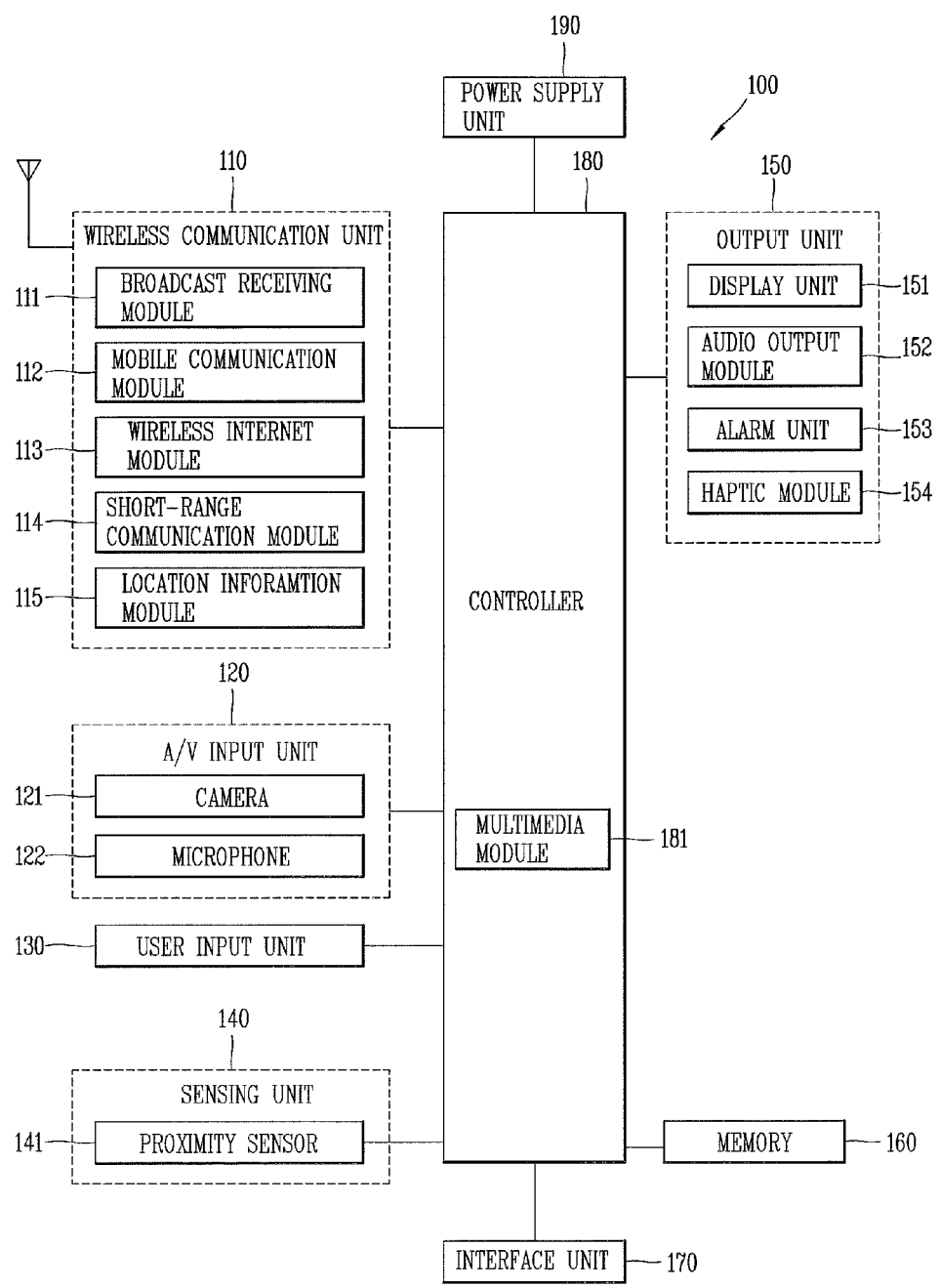
FIG. 1 is a block diagram of a mobile terminal in accordance with one exemplary embodiment of this specification.

FIG. 1 is a block diagram of a mobile terminal 100 in accordance with one embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented. The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal. Examples of broadcast associated information may include information associated with a broadcast channel, a broadcast program, a broadcast service provider, and the like. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display or the like. Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Figure 2:
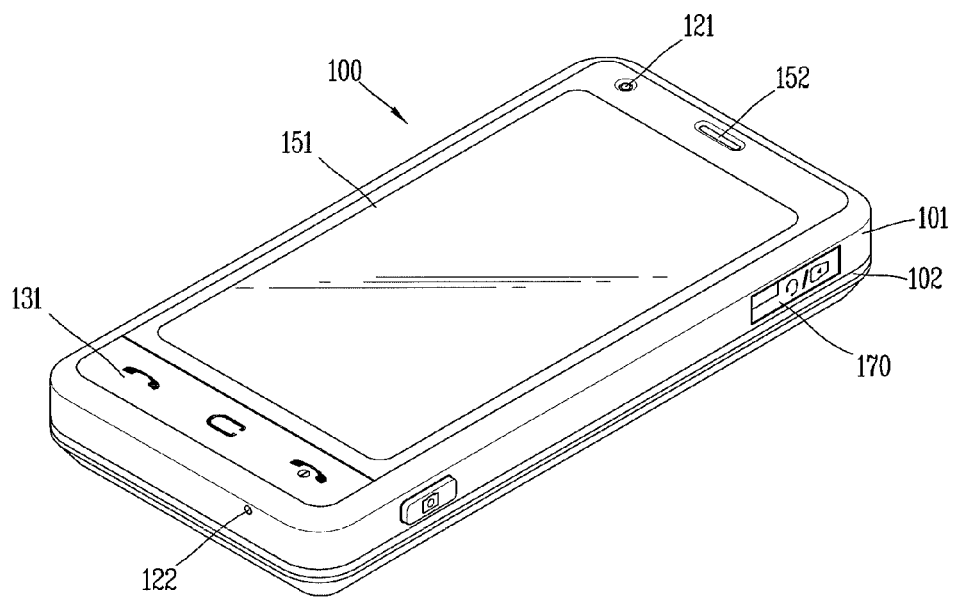
FIG. 2 is a front perspective view of the mobile terminal.
Figure 3:
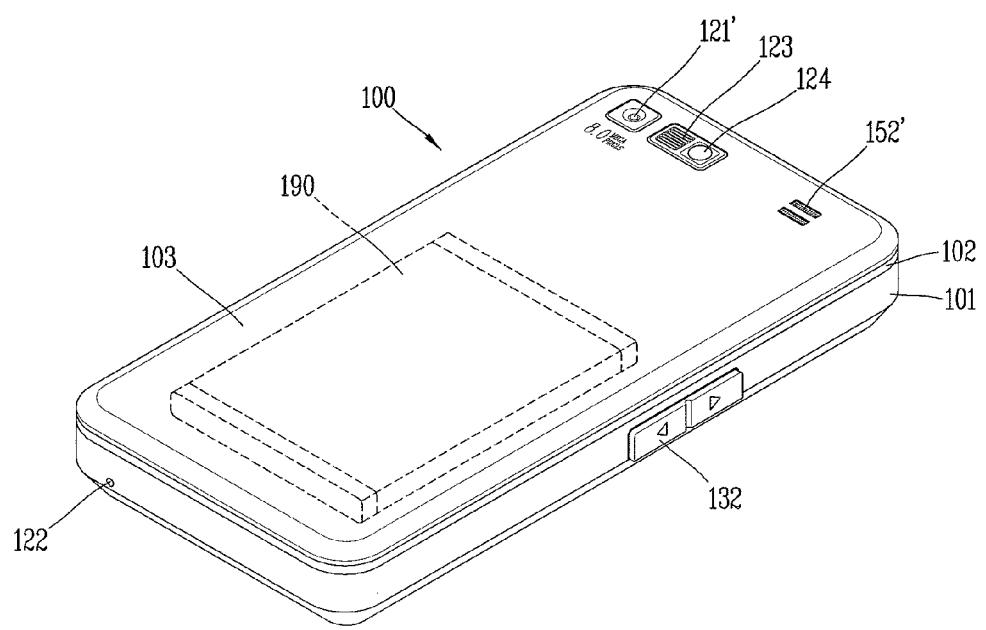
FIG. 3 is a rear perspective view of the mobile terminal shown in FIG. 2.

FIG. 2 is a front perspective view showing an example of the mobile terminal, and FIG. 3 is a rear perspective of the mobile terminal of FIG. 2. The mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

The terminal body may include a case (or referred to as casing, housing, cover, etc.) defining an appearance of the mobile terminal 100. In this exemplary embodiment, the case may be divided into a front case 101 and a rear case 102. A space formed between the front and rear cases 101 and 102 may accommodate various electronic components. One or more intermediate cases may be additionally disposed between the front case 101 and the rear case 102. Such cases may be injected using a synthetic resin or be formed of a metal, such as stainless steel (STS), titanium (Ti) or the like.

The terminal body is shown having a display unit 151, an audio output module 152, a camera module 121, a user input unit 130/131, 132, a microphone 122, an interface unit 170, and the like.

The display unit 151 may occupy most of a principal surface of the front case 101. The audio output module 152 and the camera 121 may be disposed near one of both end portions of the display unit 151, and the user input unit 131 and the microphone 122 on the other end portion of the display unit 151. The user input unit 131, the interface unit 170 and the like may be disposed on side surfaces of the front and rear cases 101 and 102.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display module 210 into a touch recognition mode, or the like.

FIG. 3 is a rear perspective view of the mobile terminal shown in FIG. 2. As shown in FIG. 3, the rear case 102 of the terminal body may further be provided with a camera 121'. The camera 121' faces a direction which is opposite to a direction faced by the camera 121 (see FIG. 2), and may have different pixels from those of the camera 121. For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear face of the terminal body, namely, the rear case 102. The audio output module 152' can cooperate with the audio output module 152 (see FIG. 2) to provide stereo output. Also, the audio output module 152' may be configured to operate as a speakerphone.

A broadcast signal receiving antenna (not shown) for calls or the like may be additionally disposed at the side surface of the terminal body. The antenna configuring a part of the broadcast receiving module 111 (see FIG. 1) may be retractable into the terminal body.

A power supply unit 190 for supplying power to the mobile terminal 100 may be mounted in the terminal body. The power supply unit 190 may be mounted in the terminal body or detachably coupled directly onto the outside of the terminal body. A battery cover 103 which restricts a separation of a battery 191 may be detachably coupled to the rear case 102.

Figure 4:
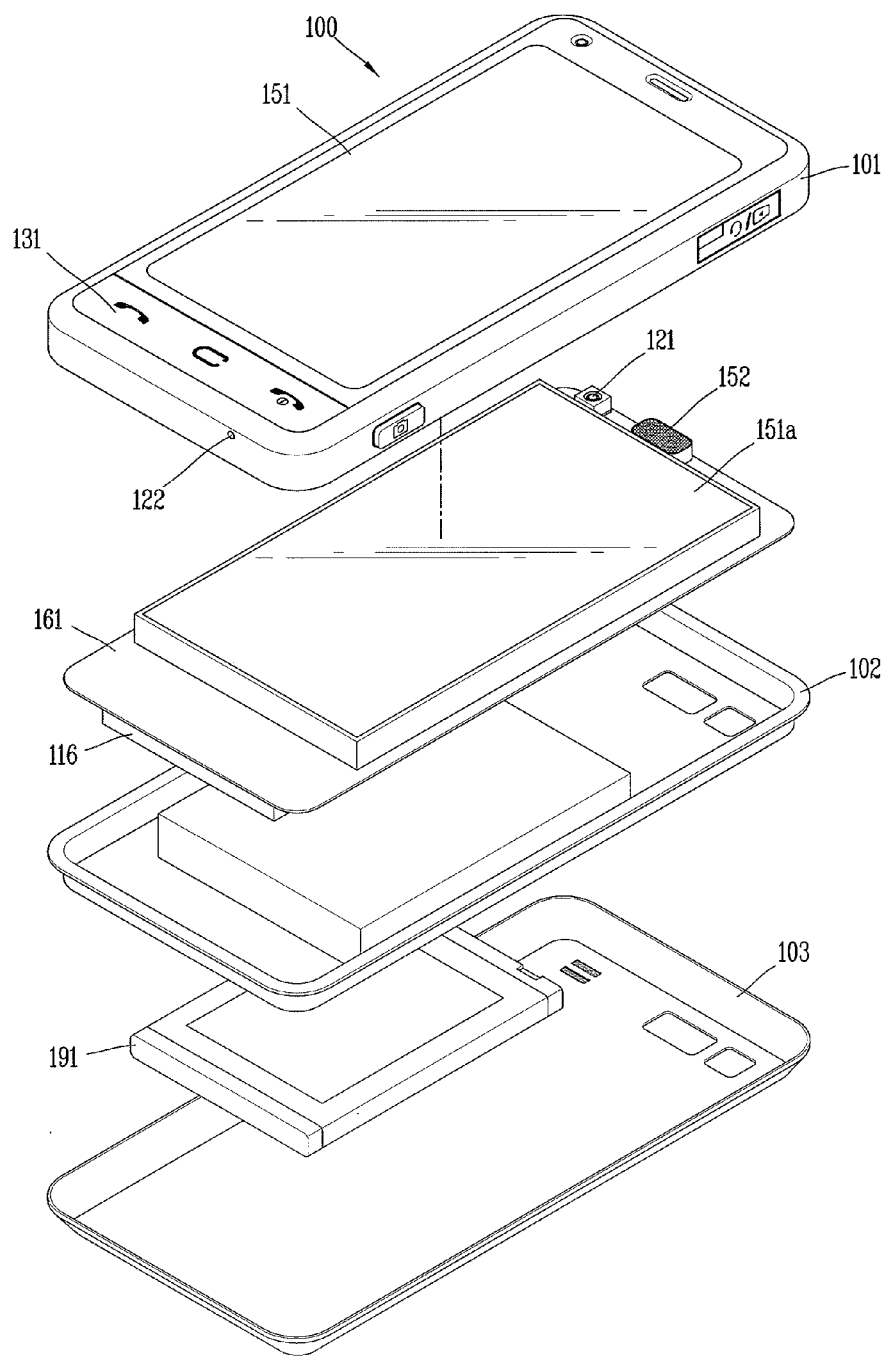
FIG. 4 is a disassembled perspective view of the mobile terminal shown in FIG. 2.

FIG. 4 is a disassembled perspective view of the mobile terminal 100 shown in FIG. 2, which shows an antenna device 116 disposed within a terminal body. As shown in FIG. 4, a printed circuit board 161 may be disposed within an inner space of the terminal body. The printed circuit board 161 may be mounted onto the rear case 102 to occupy most of a principal surface of the terminal body. The printed circuit board 161 may be configured as one example of the controller 180 (see FIG. 1) which controls the mobile terminal 100 to execute a variety of functions. For example, the printed circuit board 161 may display (output) information processed in the mobile terminal 100 via the display 151*a*.

Electronic devices for operating various functions of the mobile terminal 100 may be mounted onto at least one surface of the printed circuit board 161. For example, a display 151*a*, an audio output module 152, a camera module 121 and the like may be mounted onto one surface of the printed circuit board 161.

An antenna device 116 for transmitting and receiving electric waves may be disposed on one side (or one surface) of the printed circuit board 161. The antenna device 116 may be disposed at one end of the terminal body, for example, at a position spaced from the audio output module 152, namely, a position adjacent to the microphone 122 to minimize a bad influence upon a user due to the electronic waves. The antenna device 116 may be provided in plurality to have different functions. The plurality of antenna devices 116 may be disposed with being spaced apart from each other with a preset interval to minimize interference with each other. For example, the plurality of antenna devices 116 may be disposed at both ends of the mobile terminal 100 in a lengthwise direction with interposing the display 151*a* therebetween.

[First Exemplary Embodiment]

Figure 5:
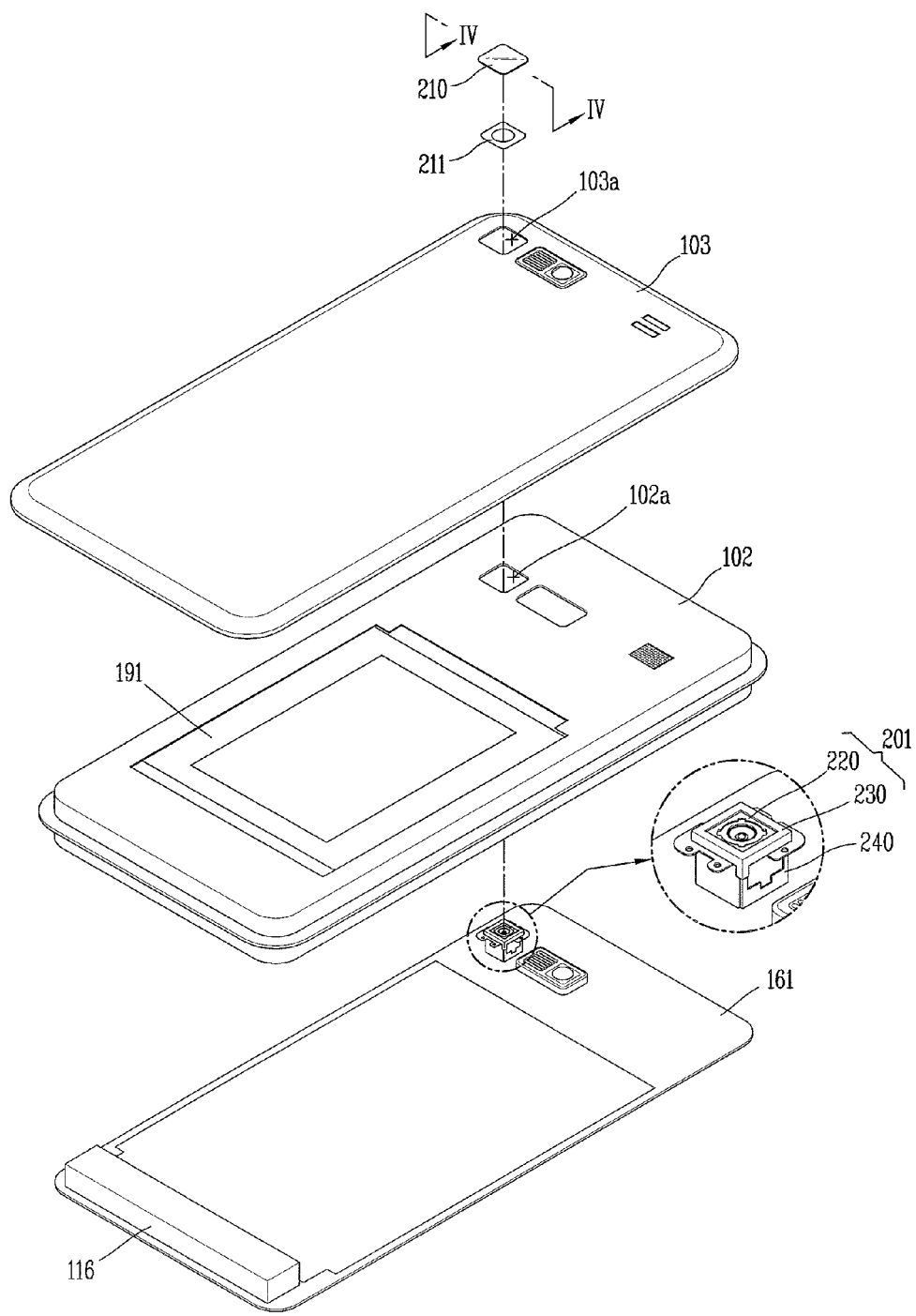
FIG. 5 is a conceptual view showing a coupling relation among a first case, a second case and a window in accordance with a first exemplary embodiment.
Figure 6:
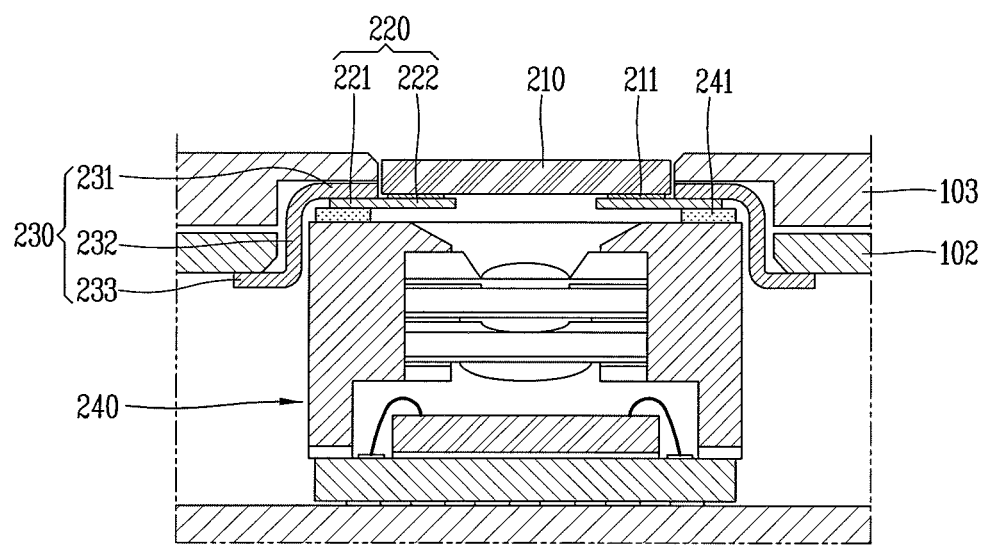
FIG. 6 is a sectional view showing a coupling relation among components in a state that a camera module is coupled to the second case.
Figure 7:
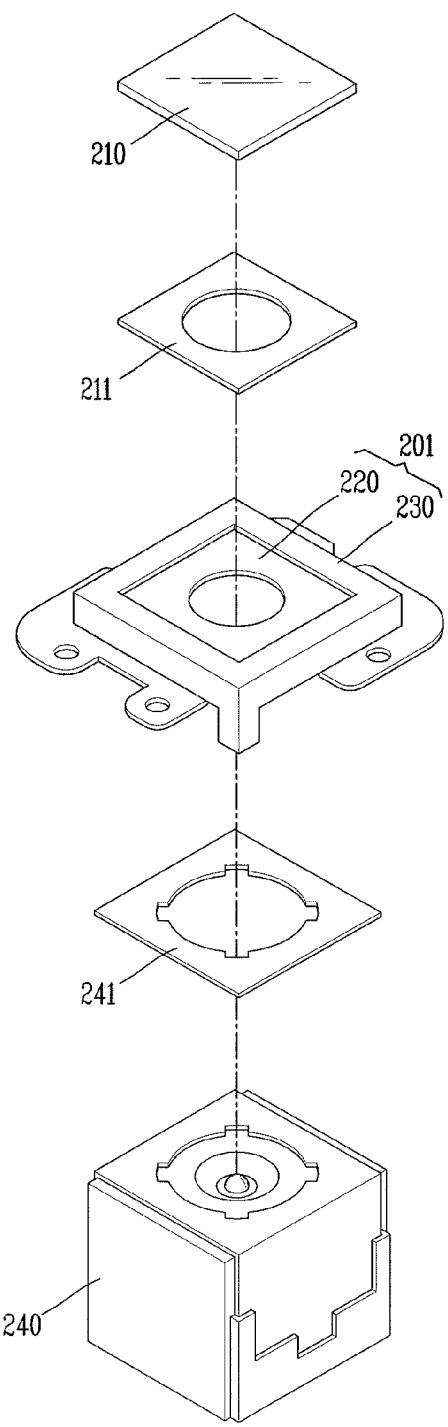
FIG. 7 is a disassembled perspective view of FIG. 6 in a state of the first and second cases removed.

FIG. 5 is a conceptual view showing a coupling relation among a first case, a second case and a window in accordance with a first exemplary embodiment, FIG. 6 is a coupling relation among components in a state that a camera module is coupled to the second case, and FIG. 7 is a disassembled perspective view of FIG. 6 in a state of the first and second cases removed. As shown in FIGS. 5 and 6, a first case and a second case may include a first opening 103*a* and a second opening 102*a*, respectively. Assuming that the rear case 102 is the second case which covers a rear surface of the terminal, the battery cover 103 may be the first case for covering the second case 102.

A window 210 may be disposed to shield one of the first opening 103*a* or the second opening 102*a*. To mount the window 210 thereon, a support frame 201 may be disposed within the second case 102.

When a case having an opening is made of synthetic resin, an end portion of the case adjacent to the opening may be vulnerable to breaking. Hence, to maintain rigidity, a part of the case adjacent to the opening may be made of a metal. Unlike this, the support frame 201 which is made of a metal may be integrally formed with a case. The support frame 201 may thusly increase the rigidity of the case.

The window 210 may be mounted onto the support frame 201. This may allow the window 210 to be flush with the first case 103 without protruding to the outside of the first case 103. The support frame 201 may include a first member 220 and a second member 230. The first member 220 and the second member 230 may be integrally welded with each other. The first member 220 may be a plate having a hollow hole.

The window 210 may be coupled onto the first member 220. Here, an adhesive layer 211 may be formed between the first member 220 and the window 210 such that the first member 220 and the window 210 can be coupled to each other. The adhesive layer 211 may be implemented as an adhesive or a double-sided tape.

The first member 220 may include a mounting portion 222 to which the window 210 is coupled, and an extending portion 221 extending to face a coupling portion of the second member 230, which will be explained later, so as to be coupled to the coupling portion. The coupling portion of the second member 230 and the extending portion 221 of the first member 220 may extend in parallel to face each other.

The adhesive layer 211 may shield at least a part of the mounting portion 222. This may allow the mounting portion 222 and the window 210 to be coupled to each other by virtue of the adhesive layer 211.

The second member 230 may be integrally formed with the first member 220 and coupled to the second case 102. When the window 210 is coupled to the first member 220, the window 210 may be arranged to contact a side surface of the second member 230. This may prevent the window 210 from being laterally moved, namely, moved in left and right directions.

The second member 230 may include a coupling portion 231, a first curved portion 232 and a second curved portion 233. One surface of the coupling portion 231 may be coupled to the extending portion 221 of the first member 220, and another surface of the coupling portion 231 may be coupled to the first case 103. The first curved portion 232 may be curved from the coupling portion 231 to extend by a predetermined height. The second curved portion 233 may be curved from the first curved portion 232 to extend in parallel to the coupling portion 231. The second curved portion 233 may be coupled to the second case 102. The second curved portion 233 may be bonded or adhered onto the second case 102. Also, at least a part of the second curved portion 233 may be inserted into the second case 102 such that the second case 102 and the second curved portion 233 can be integrally formed with each other. The second curved portion 233 may be integrally molded with the second case 102 through insert injection.

A camera module 240, which is an image input unit for inputting an image, may be disposed through the first opening 103*a* and the second opening 102*a*. The camera module 240 may have a predetermined thickness since a lens and an area on which an image is projected have to be spaced apart by more than a predetermined distance. Hence, the terminal may become thicker by the thickness of the camera module 240, or the camera module 240 should partially protrude to the outside. When the camera module 240 partially protrudes, it may cause limitation on design.

As shown in FIG. 6, the camera module 240 may be disposed to protrude from the second case 102 via the second opening 102*a*. The support frame 201 may be disposed to shield the portion of the camera module 240 which protrudes through the second case 102. In more detail, the second curved portion 233 may be coupled to an inside of the second case 102, and the first curved portion 232 may extend through the second opening 102*a*. One surface of the extending portion 221 may be coupled to the coupling portion 231, and another surface of the extending portion 221 may be disposed to face the camera module 240.

The camera module 240 may be coupled to the support frame 201. A buffering member 241 may be formed between the camera module 240 and the first member 220 to prevent contact between the camera module 240 and the first member 220.

The first case 103 may include a recess which is recessed into an inner surface thereof. The camera module 240 may protrude from the second case 102, and accordingly the second member 230 may also protrude from the second case 102. The protruding portion of the second member 230 may be inserted into the recess of the first case 103. One surface of the coupling portion 231 may be coupled to the extending portion 221, and another surface of the coupling portion 231 may be disposed to face the recess of the first case 103. As such, in accordance with the first exemplary embodiment, the mobile terminal may have the support frame 201 and the cases having such configurations, thereby implementing a unified design without protrusion of any one of the window 210 or the cases.

[Second Exemplary Embodiment]

Figure 8:
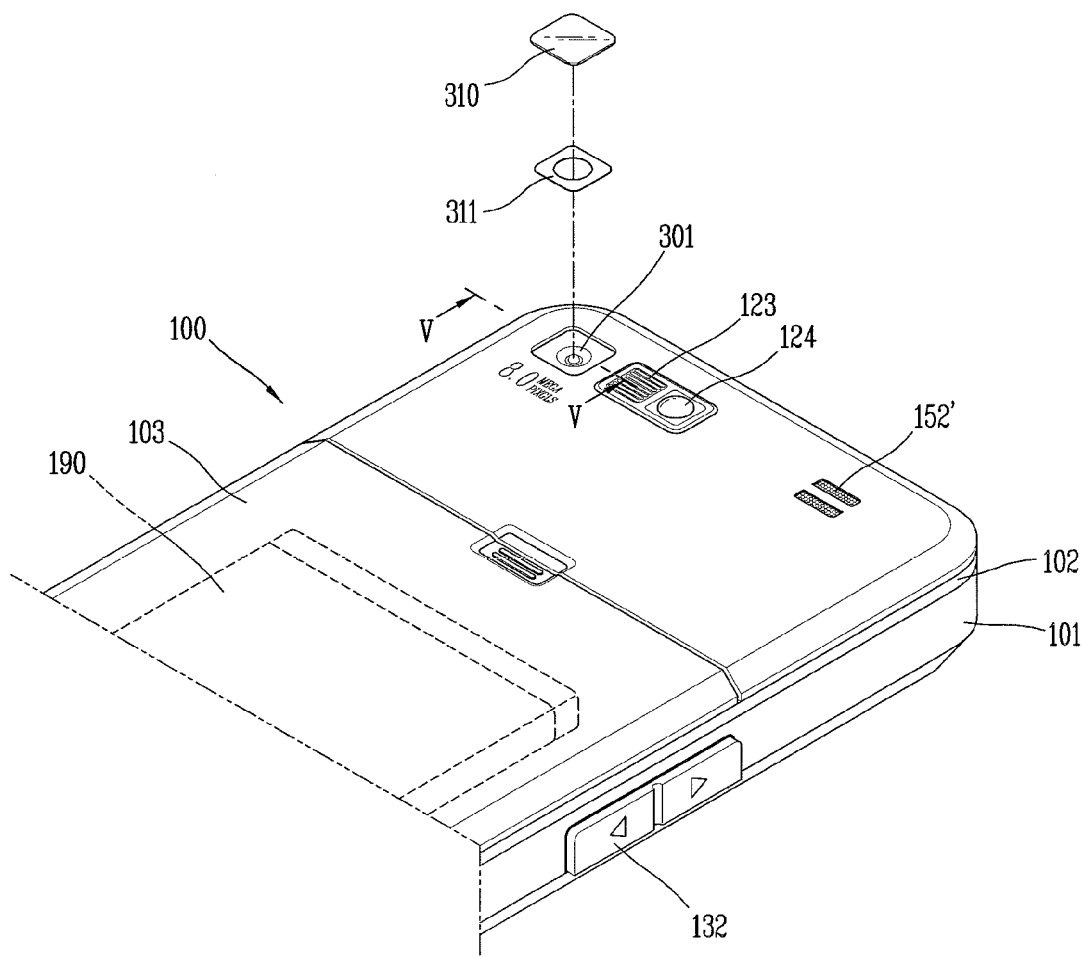
FIG. 8 is a conceptual view showing a coupling relation between a case and a window in accordance with a second exemplary embodiment.
Figure 9:
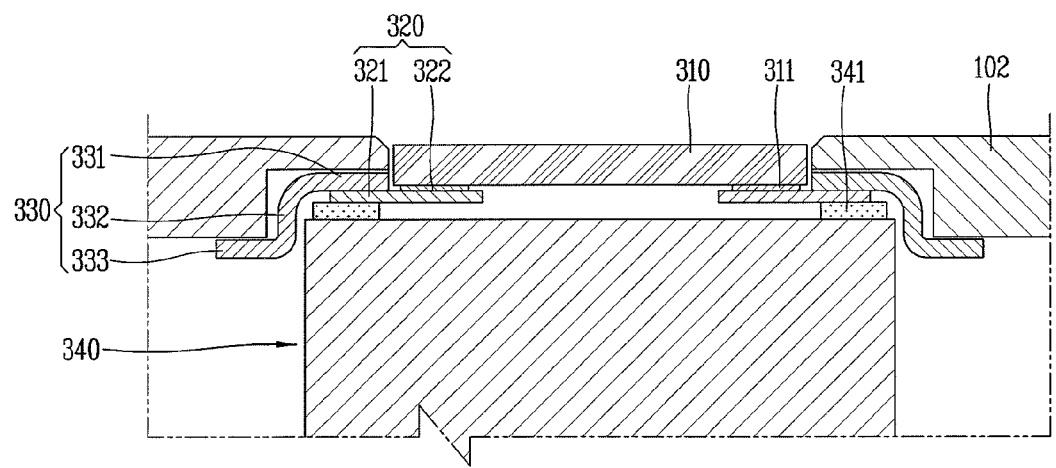
FIG. 9 is a sectional view taken along the line IV-IV of FIG. 8.

FIG. 8 is a conceptual view showing a coupling relation between a case and a window in accordance with a second exemplary embodiment, and FIG. 9 is a sectional view taken along the line IV-IV of FIG. 8. A case according to this exemplary embodiment corresponds to the rear case 102. As illustrated, the case defining an appearance of the terminal may include at least one opening. A window 310 may be disposed to shield the opening. A camera module 340 by which an image is inputted may be aligned through the opening.

The window 310 may be mounted onto a support frame 301 which is formed inside the case 102. The support frame 301 may include a first member 320 and a second member 330. The first member 320 and the second member 330 may be integrally welded with each other.

The window 310 may be coupled to the first member 320. Here, an adhesive layer 311 may be formed between the first member 320 and the window 311 such that the first member 320 and the window 311 can be coupled to each other. The first member 320 may be a plate having a hollow hole. The first member 320 may include a mounting portion 322 to which the window 310 is coupled, and an extending portion 321 extending to face a coupling portion 331 of the second member 330, which will be explained later, so as to be coupled to the coupling portion 331. The coupling portion 331 of the second member 330 and the extending portion 321 of the first member 320 may extend in parallel to face each other.

The adhesive layer 311 may be formed to shield at least a part of the mounting portion 322. This may allow the mounting portion 322 and the window 310 to be coupled to each other by virtue of the adhesive layer 311.

The second member 330 may be integrally formed with the first member 320, and coupled to the case 102. When the window 310 is coupled to the first member 320, the window 310 may be disposed to contact a side surface of the second member 330. This may prevent the window 310 from being laterally moved, namely, moved in left and right directions.

The second member 330 may include a coupling portion 331, a first curved portion 332 and a second curved portion 333. One surface of the coupling portion 331 may be coupled to the extending portion 321 of the first member 320, and another surface of the coupling portion 331 may be coupled to the case 102. The first curved portion 332 may be curved from the coupling portion 331 to extend by a predetermined height. The second curved portion 333 may be curved from the first curved portion 332 to extend in parallel to the coupling portion 331. The second curved portion 333 may be coupled to the case 102. The second curved portion 333 may be bonded or adhered onto the case 102. Also, at least a part of the second curved portion 333 may be inserted into the case 102 such that the case 102 and the second curved portion 33 can be integrally formed with each other.

The second curved portion 333 may be integrally molded with the case 102 by insert injection. Here, the case 102 may be made of synthetic resin, and the second curved portion 333 may be made of a metal. As the second curved portion 333 is integrally formed with the case 102, the case 102 may have an increased rigidity.

A camera module 340 may be coupled to the support frame 301. A buffering member 341 may be formed between the camera module 340 and the first member 320 to prevent contact between the camera module 340 and the first member 320. As such, in accordance with the second exemplary embodiment, the mobile terminal may include the support frame 301 and the case 102 having such configurations, thereby implementing a unified design without protrusion of any one of the window 310 or the case 102.

[Third Exemplary Embodiment]

Figure 10:
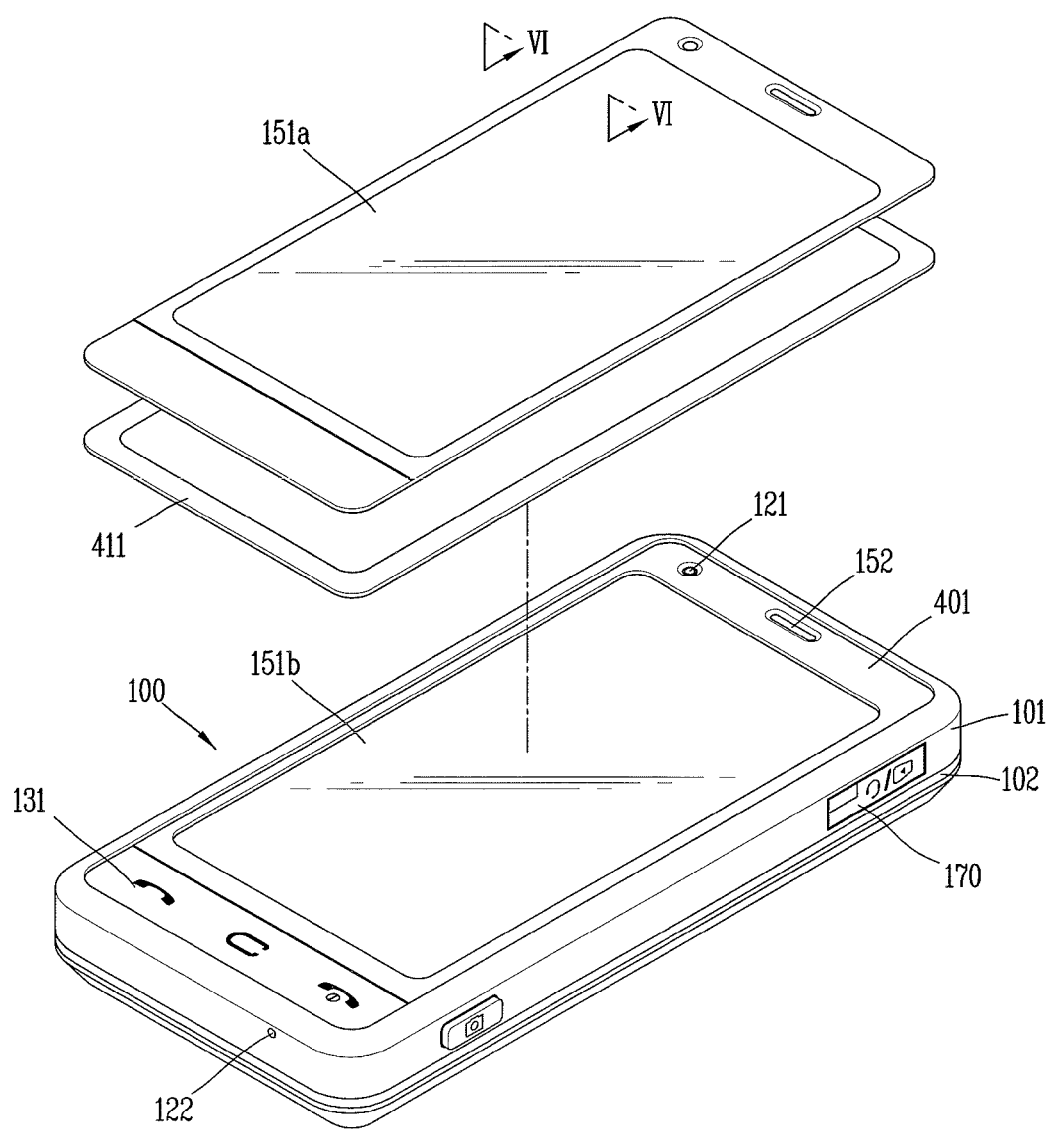
FIG. 10 is a conceptual view showing a coupling relation between a case and a window in accordance with a third exemplary embodiment.
Figure 11:
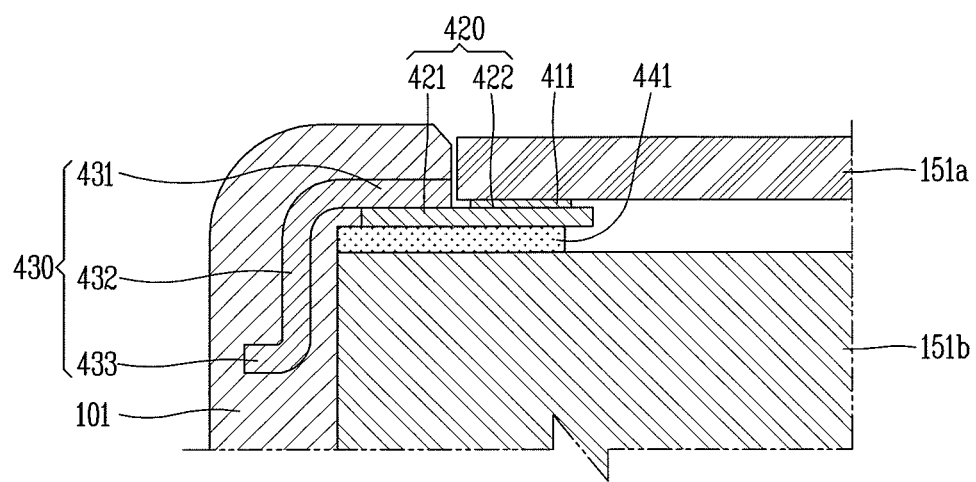
FIG. 11 is a sectional view taken along the line V-V of FIG. 10.

FIG. 10 is a conceptual view showing a coupling relation between a case and a window in accordance with a third exemplary embodiment, and FIG. 11 is a sectional view taken along the line V-V of FIG. 10. A case according to the third exemplary embodiment corresponds to the front case 101. As illustrated, the case 101 defining the appearance of the mobile terminal may include at least one opening. A window 151a may shield the opening. A display module 151b for outputting information may be disposed through the opening.

The window 151a may be mounted on a support frame formed within the case 101. The support frame may include a first member 420 and a second member 430. The first member 420 and the second member 430 may be integrally welded with each other. The window 151a may be coupled to the first member 420. Here, an adhesive layer 411 may be formed between the first member 420 and the window 151a such that the first member 420 and the window 151a can be coupled to each other. The first member 420 may be a plate having a hollow hole. The first member 420 may include a mounting portion 422 to which the window 151a is coupled, and an extending portion 421 extending to face a coupling portion 431 of the second member 430, which will be explained later, so as to be coupled to the coupling portion 431. The coupling portion 431 of the second member 430 and the extending portion 421 of the first member 420 may extend in parallel to face each other.

The adhesive layer 411 may shield at least a part of the mounting portion 422. This may allow the mounting portion 422 and the window 151a to be coupled to each other by virtue of the adhesive layer 411.

The second member 430 may be integrally fainted with the first member 420, and coupled to the case 101. When the window 151a is coupled to the first member 420, the window 151a may be disposed to contact a side surface of the second member 430. This may allow the window 151a from being laterally moved, namely, moved in left and right directions.

The second member 430 may include a coupling portion 431, a first curved portion 432 and a second curved portion 433. One surface of the coupling portion 431 may be coupled to the extending portion 421 of the first member 420, and another surface of the coupling portion 431 may be coupled to the case 101. The first curved portion 432 may be curved from the coupling portion 431 to extend by a predetermined height. The second curved portion 433 may be curved from the first curved portion 432 to extend in parallel to the coupling portion 431. The second curved portion 433 may be coupled to the case 101. The second curved portion 433 may be bonded or adhered onto the case 101. Also, at least a part of the second curved portion 433 may be inserted into the case 101 such that the case 101 and the second curved portion 433 can be integrally faulted with each other. The second curved portion 433 may be integrally molded into the case 101 by insert injection. Here, the case 101 may be made of synthetic resin, and the second curved portion 433 may be made of a metal. The second curved portion 433 may be integrally formed with the case 101, thereby increasing rigidity of the case 101. With the increased rigidity of the case 101, the case 101 may become slimmer, resulting in acquiring a slimmer terminal.

A display module 151b and the support frame may be coupled to each other. A buffering member 441 may be formed between the display module 151b and the first member 420 to prevent contact between the display module 151b and the first member 420. As such, in accordance with the third exemplary embodiment, the mobile terminal may include the support frame and the case 101 having such configurations, thereby implementing a unified design without protrusion of any one of the window 151a or the case 101.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body having a case defining an appearance of the terminal body, the case having at least one opening;
   a window disposed to shield the opening; and
   a support frame located within the case, the window being mounted on the support frame, the support frame including:
   a first member to which the window is coupled; and
   a second member integrally formed with the first member, the second member being coupled to the case, the second member including:
      a coupling portion to which the first member is coupled;
      a first curved portion extending from the coupling portion towards an interior of the terminal body, the first curved portion extending a predetermined distance towards the interior; and
      a second curved portion extending from one end of the first curved portion towards the case.

2. The mobile terminal of claim 1, further comprising an adhesive layer located between the window and the first member such that the window and the first member are coupled to each other.

3. The mobile terminal of claim 1, wherein the second curved portion is coupled to the case.

4. The mobile terminal of claim 1, wherein at least a portion of the second curved portion is inserted into the case.

5. The mobile terminal of claim 4, wherein the case is made of synthetic resin and the second member is made of metal, and
   wherein the second member is integrally molded with the case by insert injection.

6. The mobile terminal of claim 1, wherein the first member includes a mounting portion to which the window is coupled and an extending portion projecting away from the mounting portion.

7. The mobile terminal of claim 1, wherein the window is disposed to contact one side surface of the second member to prevent laterally movement of the window.

8. The mobile terminal of claim 1, wherein the first member and the second member are integrally welded to each other.

9. The mobile terminal of claim 1, further comprising:
   a camera module aligned with the opening; and
   a buffering pad located between the camera module and the first member.

10. A mobile terminal comprising:
    a terminal body having a first case and a second case, the first case defining an appearance of the terminal body and having a first opening, the second case being located within the first case and having a second opening formed under the first opening;
    a window disposed to shield the opening; and
    a support frame located within the second case, the window being mounted on the support frame, the support frame including:
    a first member to which the window is coupled; and
    a second member integrally formed with the first member and coupled to the second case, the second member including:
       a coupling portion to which the first member is coupled;
       a first curved portion extending from the coupling portion towards an interior of the terminal body, the first curved portion extending a predetermined distance towards the interior; and
       a second curved portion extending from one end of the first curved portion towards the second case.

11. The mobile terminal of claim 10, further comprising an adhesive layer located between the window and the first member such that the window and the first member are coupled to each other.

12. The mobile terminal of claim 10, wherein the second curved portion is coupled to the second case.

13. The mobile terminal of claim 10, wherein at least a portion of the second curved portion is inserted into the second case.

14. The mobile terminal of claim 13, wherein the case is made of synthetic resin and the second member is made of metal, and
    wherein the second member is integrally molded with the case by insert injection.

15. The mobile terminal of claim 10, wherein the first member includes a mounting portion to which the window is coupled and an extending portion projecting away from the mounting portion.

16. The mobile terminal of claim 10, wherein the window is disposed to contact one side surface of the second member to prevent lateral movement of the window.

17. The mobile terminal of claim 10, wherein the first member and the second member are integrally welded with each other.

18. The mobile terminal of claim 10, further comprising:
    a camera module aligned with the first and second openings; and
    a buffering pad located between the camera module and the first member.

19. The mobile terminal of claim 10, wherein at least a portion of the second member protrudes through the second opening from inside of the second case to outside of the second case.

20. The mobile terminal of claim 19, wherein the first case comprises a recess recessed into an inner surface thereof to receive the protruding portion of the second member to prevent the protruding portion from protruding outside of the first case.

* * * * *